March 25, 1941.                J. FUCHS                2,236,477

CHECK VALVE

Filed Nov. 13, 1939

INVENTOR.
Julius Fuchs.
BY Lawler & Lawler
ATTORNEYS.

Patented Mar. 25, 1941

2,236,477

UNITED STATES PATENT OFFICE 2,236,477

CHECK VALVE

Julius Fuchs, Cleveland, Ohio, assignor of one-half to Augustus J. Baker, Cleveland, Ohio Application November 13, 1939, Serial No. 304,111

1 Claim. (Cl. 251—119)

My invention relates broadly to a check valve.

The invention consists substantially in the construction, combination and arrangement of parts, associated therewith or as will be more fully hereinafter set forth as shown in the accompanying drawing and finally pointed out in the appended claim.

Reference is to be had to the accompanying drawing forming part of this specification in which like reference characters indicate corresponding parts throughout the several views, and in which.

Figure 1:
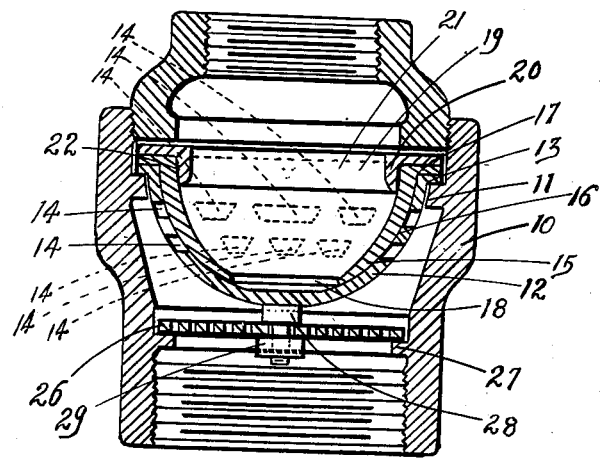
Figure 1 is a central section through the check valve.

Referring to Figure 1, 10 represents a suitable valve housing of a coupling configuration, having a concentrically arranged seat 11 therein.

The valve cup 12 is of hemispherical cup shaped configuration and is provided with an annular flange 13 and a plurality of passages having gradually widening areas as at 14 in spaced relation therein.

The flexible valve member 15 is formed to fit a portion of the inner surface 16 of the valve cup. The flexible valve is provided with an annular flange 17, adapted to overlie the flange of the valve cup. The flexible valve is also provided with an opening 18 at its bottom. The flexible valve is tapered progressively downward from its annular flange to give it flexibility in action.

The retaining guard 19 is provided with an annular flange 20 adapted to overlie and seat on the flange of flexible valve member and is further provided with a portion 21 that fits in the flexible valve member as at 22.

Figure 2:
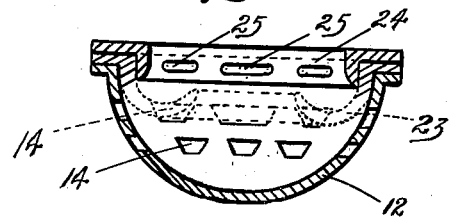
Figure 2 is a central section through the valve cup, the flexible valve, and the retaining guard.

In non-metallic types of flexible valve members, whether hard or flexible, the valve member has frequently to be discarded before it is worn out, owing to the wear caused by its movement. The valve-seating becomes defective, and air or water leakage results involving considerable loss in efficiency. The guard holds the flexible valve accurately in place while allowing it to bend freely inwardly as shown in the chain lines 23. The guard, when the assembly is completed, reinforces the valve at the top and at the same time properly beds the valve in the valve cup, so that leakage at this location is avoided. The guard may be vulcanised onto the flexible valve if desired. A means of accomplishing same is shown at 24 in Figure 2 where the portion 21 is provided with a plurality of elongated through slots 25 to permit the material of the valve to extend inwardly to hold the guard and the valve together. Obviously other means may be employed, for instance, ribs or grooves.

It may be found convenient to arrange a removably mounted perforated metal plate or screen 26 in the valve housing. This screen may be supported on the seat 27 and may be removably attached to the valve cup by means of an integral stud 28 on the bottom of the valve cup. The screen may be held in assembled relation on the valve cup by means of a nut 29. Obviously the screen may be free from attachment with the valve cup, in other words the stud may be free from the valve cup, and used merely to hold the screen when the valve cup rests upon it while in place. When so constructed, the stud may be used as a means by which the screen may be lifted out of the valve housing.

In operation, fluid enters the valve through the passages in the valve cup, and acts on the flexible valve member forcing it in as shown in the chain lines and fluid under pressure above the valve automatically returns the valve to its normal position, thereby preventing back-flow by effectively closing the passages in the valve cup.

Other applications and other modifications are contemplated within the scope of the present invention, as will be apparent to those skilled in the art. It is therefore to be understood that the embodiment herein disclosed is to be regarded as illustrative of the invention, and not restrictive, and the appended claim is to be construed broadly except as limitations may be necessary in view of the prior art.

What I claim is:

A check valve comprising a valve casing assembly consisting of an upper portion, a lower portion, an inwardly projecting seat in the lower portion, a valve cup of hemispherical configuration having circumferentially disposed passageways therethrough and formed with an external peripherial flange and a closed extremity removably mounted on the seat in the lower portion, a resilient flexible valve having a constricted open end facing the closed end of the valve cup and formed with an external peripherial flange adapted to overlie the flange on the valve cup, and having an exterior surface shaped to conform and fit closely to the interior of the valve cup to close the passageways formed therein, the flexible valve adapted to yield inwardly and upwardly to the pressure of liquid thereagainst from the exterior of the valve cup in letting liquid pass therethrough, and to return to its normal position when pressure is exerted thereagainst on its interior, the valve cup preventing deformation of the flexible valve when pressure is exerted thereagainst interiorly.

JULIUS FUCHS.